United States Patent
Tam et al.

(10) Patent No.: US 9,366,877 B2
(45) Date of Patent: Jun. 14, 2016

(54) PLANAR DIFFRACTIVE OPTICAL ELEMENT LENS AND METHOD FOR PRODUCING SAME

(71) Applicant: Maxim Integrated Products, Inc., San Jose, CA (US)

(72) Inventors: Patrick Tam, San Francisco, CA (US); Joy T. Jones, Fremont, CA (US); Nicole D. Kerness, Menlo Park, CA (US); Arvin Emadi, Santa Clara, CA (US)

(73) Assignee: Maxim Integrated Proeducts, Inc., San Jose, CA (US)

( * ) Notice: Subject to any disclaimer, the term of this patent is extended or adjusted under 35 U.S.C. 154(b) by 153 days.

(21) Appl. No.: 13/930,093

(22) Filed: Jun. 28, 2013

(65) Prior Publication Data
US 2014/0268341 A1    Sep. 18, 2014

Related U.S. Application Data

(60) Provisional application No. 61/778,708, filed on Mar. 13, 2013.

(51) Int. Cl.
*G02B 27/42* (2006.01)
*G02B 7/28* (2006.01)
*G02B 5/18* (2006.01)

(52) U.S. Cl.
CPC .............. *G02B 27/42* (2013.01); *G02B 5/1876* (2013.01); *G02B 7/28* (2013.01)

(58) Field of Classification Search
CPC .................................. G02B 7/28; G02B 5/1876
USPC ....................................... 359/558, 618, 112.23
See application file for complete search history.

(56) References Cited

U.S. PATENT DOCUMENTS

| | | | |
|---|---|---|---|
| 2003/0076589 A1* | 4/2003 | Suleski ................ | G02B 5/1814 359/558 |
| 2004/0032659 A1* | 2/2004 | Drinkwater ................... | 359/558 |
| 2004/0096782 A1* | 5/2004 | Trott ...................... | G02B 1/105 430/321 |
| 2005/0063431 A1* | 3/2005 | Gallup et al. ..................... | 372/34 |
| 2008/0003528 A1* | 1/2008 | Gaylord et al. ............... | 430/322 |
| 2009/0160965 A1* | 6/2009 | Sorek et al. ................. | 348/222.1 |
| 2011/0188118 A1* | 8/2011 | Kley et al. ...................... | 359/558 |
| 2011/0292511 A1* | 12/2011 | Bentley ......................... | 359/558 |
| 2012/0262787 A1* | 10/2012 | Zeitner et al. ................. | 359/558 |
| 2014/0268341 A1* | 9/2014 | Tam et al. ..................... | 359/558 |

* cited by examiner

*Primary Examiner* — Bumsuk Won
*Assistant Examiner* — Grant Gagnon
(74) *Attorney, Agent, or Firm* — Advent, LLP

(57) ABSTRACT

A planar diffractive optical element (DOE) lens is described herein. The planar DOE lens includes a substrate. The planar DOE lens further includes a first layer, the first layer being formed upon the substrate. The planar DOE lens further includes a diffractive optical element, the diffractive optical element being formed upon the first layer. The planar DOE lens further includes a second layer, the second layer being formed upon the first layer. The second layer is also formed over the diffractive optical element. The second layer encloses the diffractive optical element between the first layer and the second layer. The second layer includes a planar surface.

19 Claims, 8 Drawing Sheets

CONCEPTUAL LAYOUT OF PLANAR DOE

LENS RADIUS

SIMULATED DIFFERENTIAL RESPONSE IN AN z DIRECTION

PLANAR DIFFRACTIVE OPTICAL ELEMENT LENS AND METHOD FOR PRODUCING SAME

CROSS-REFERENCE TO RELATED APPLICATIONS

This application claims priority to U.S. Provisional Application No. 61/778,708 filed on Mar. 13, 2013, entitled: "Planar Diffractive Optical Element Lens and Method for Producing Same", which is hereby incorporated by reference in its entirety.

BACKGROUND

Diffractive optics is used in many applications such as optical storage, processing, sensing and communications. Diffractive optical elements (DOEs) are thin phase elements that operate by means of interference and diffraction to produce arbitrary distributions of light or to aid in the design of optical systems. DOEs are designed for applications with lasers (e.g., high power lasers). Further, DOEs are used for waveshaping. For example, DOEs can be used as multi-spot beam splitters in beam shaping and beam profile modification. DOE's can transform a single laser beam into various simple or complex structured light patterns. DOEs offer endless possibilities in different application fields. While standard refractive optical elements such as mirrors and lenses are often bulky, expensive and limited to a specific use, DOEs are generally lightweight, compact, easily replicated and able to modulate complicated wavefronts. DOEs are also useful in manipulating multi-spectral signals.

SUMMARY

A planar diffractive optical element (DOE) lens is described herein. The planar DOE lens includes a substrate. The planar DOE lens further includes a first layer, the first layer being formed upon the substrate. The planar DOE lens further includes a diffractive optical element, the diffractive optical element being formed upon the first layer. The planar DOE lens further includes a second layer, the second layer being formed upon the first layer. The second layer is also formed over the diffractive optical element. The second layer encloses the diffractive optical element between the first layer and the second layer. The second layer includes a planar surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

Figure 2:
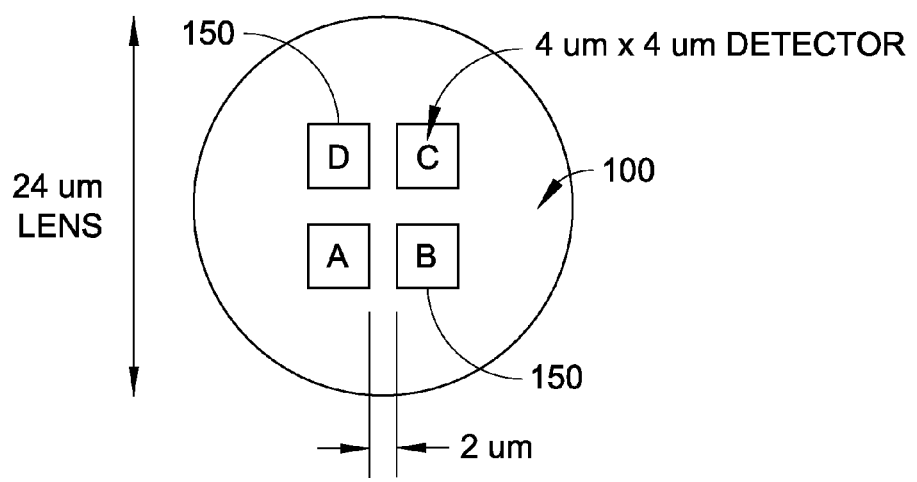
FIG. 2 is a top plan view of a planar DOE lens positioned above photodiodes when implemented in and/or as an optical lens structure of a gesture sensing device (e.g., optical sensor), the planar DOE lens having a circular (e.g., spherical) shape in accordance with an exemplary embodiment of the present disclosure.
Figure 3:
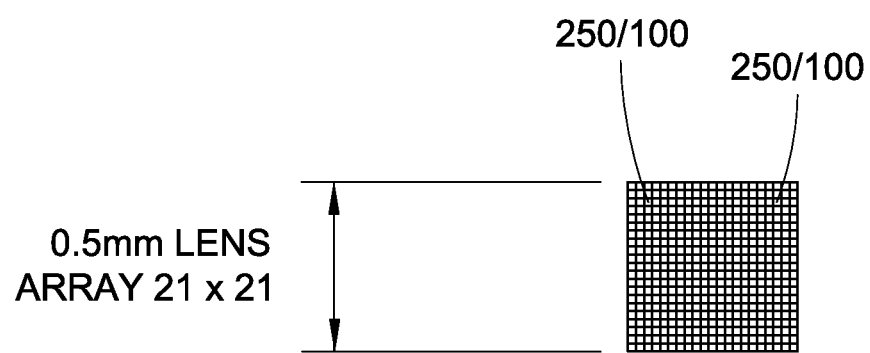
FIG. 3 is a top plan view of an array of planar DOE lenses positioned above a 21×21 array of photodiodes when implemented in and/or as an optical lens structure of a gesture sensing device (e.g., optical sensor), the lenses of the planar DOE lens array having a square shape in accordance with an exemplary embodiment of the present disclosure.
Figure 4:
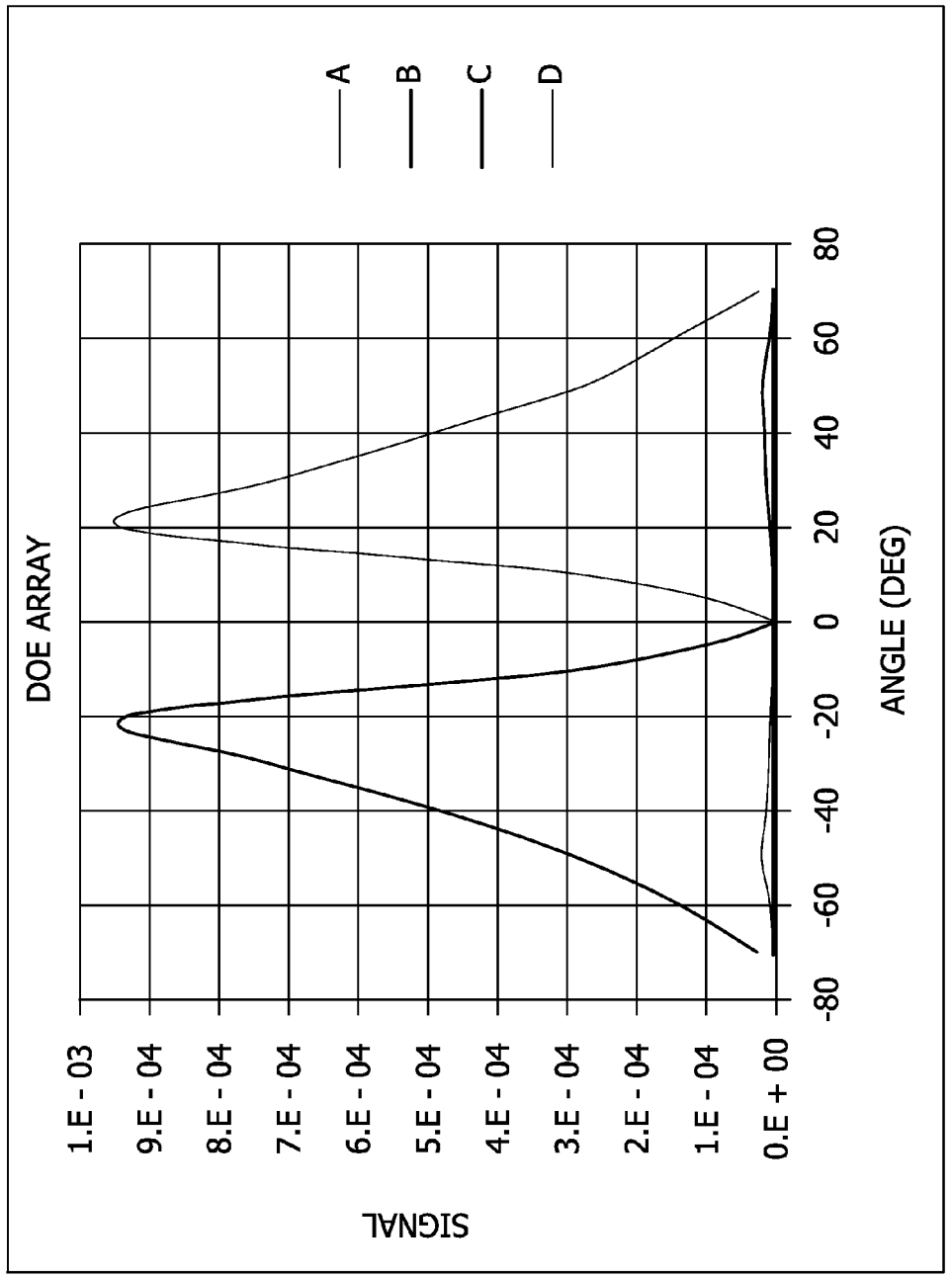

FIG. 4 provides a graphical depiction of simulation results for a planar DOE lens when the planar DOE lens is implemented as shown in FIG. 2 and/or FIG. 3, the graphical depiction plotting diode signal strength versus light angle in accordance with an exemplary embodiment of the present disclosure.

Figure 5:
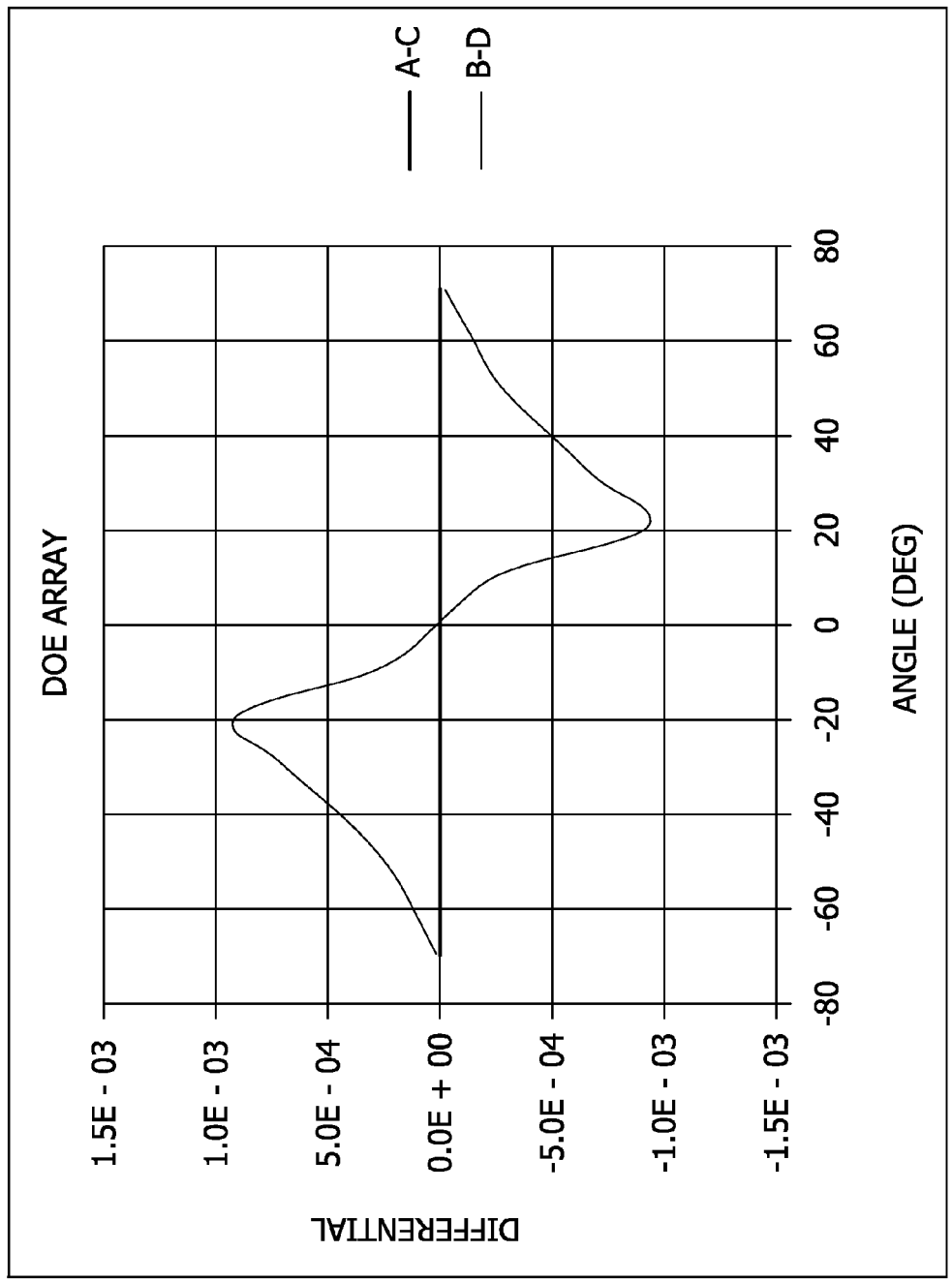

FIG. 5 provides a graphical depiction of simulation results for a planar DOE lens when the planar DOE lens is implemented as shown in FIG. 2 and/or FIG. 3, the graphical depiction plotting differential response versus light angle in accordance with an exemplary embodiment of the present disclosure.

Figure 6:
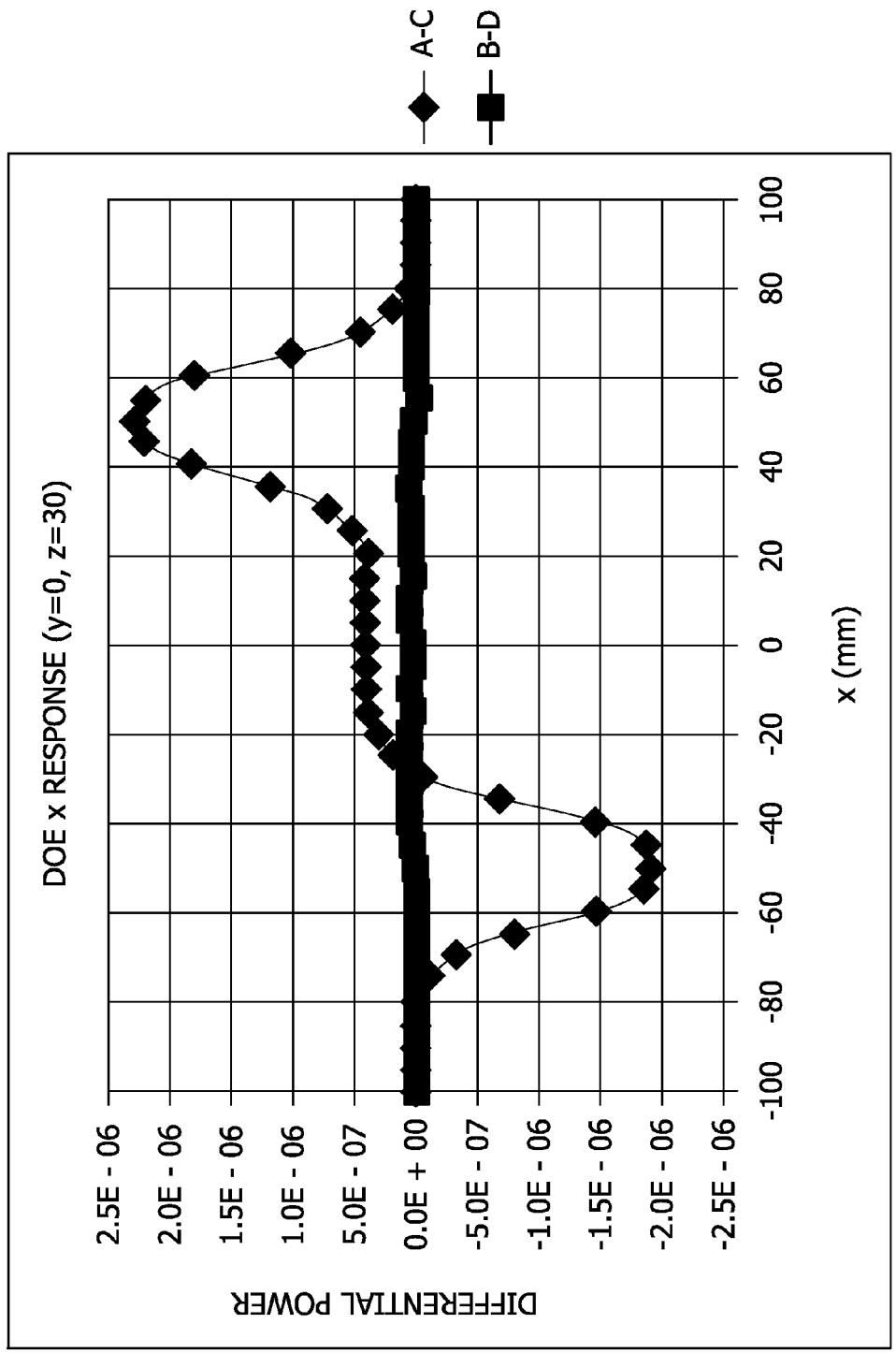

FIG. 6 provides a graphical depiction of simulation results for an xyz finger scan for a planar DOE lens when the planar DOE lens is implemented as shown in FIG. 2 and/or FIG. 3, the graphical depiction illustrating simulated diode signal response in a first direction (e.g., an x-direction; along an x-axis) in accordance with an exemplary embodiment of the present disclosure.

Figure 7:
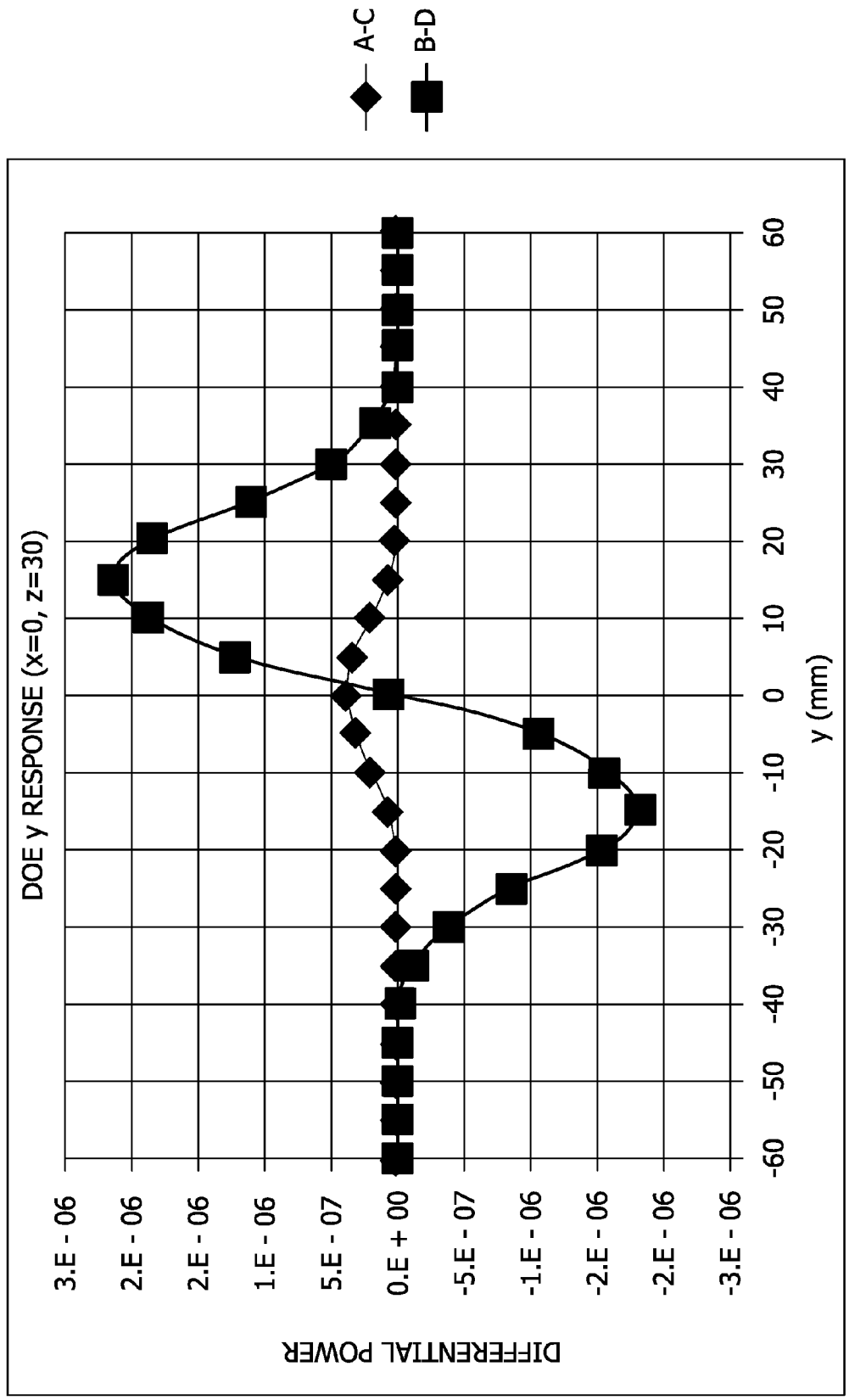

FIG. 7 provides a graphical depiction of simulation results for an xyz finger scan for a planar DOE lens when the planar DOE lens is implemented as shown in FIG. 2 and/or FIG. 3, the graphical depiction illustrating simulated diode signal response in a second direction (e.g., a y-direction; along a y-axis) in accordance with an exemplary embodiment of the present disclosure.

Figure 8:
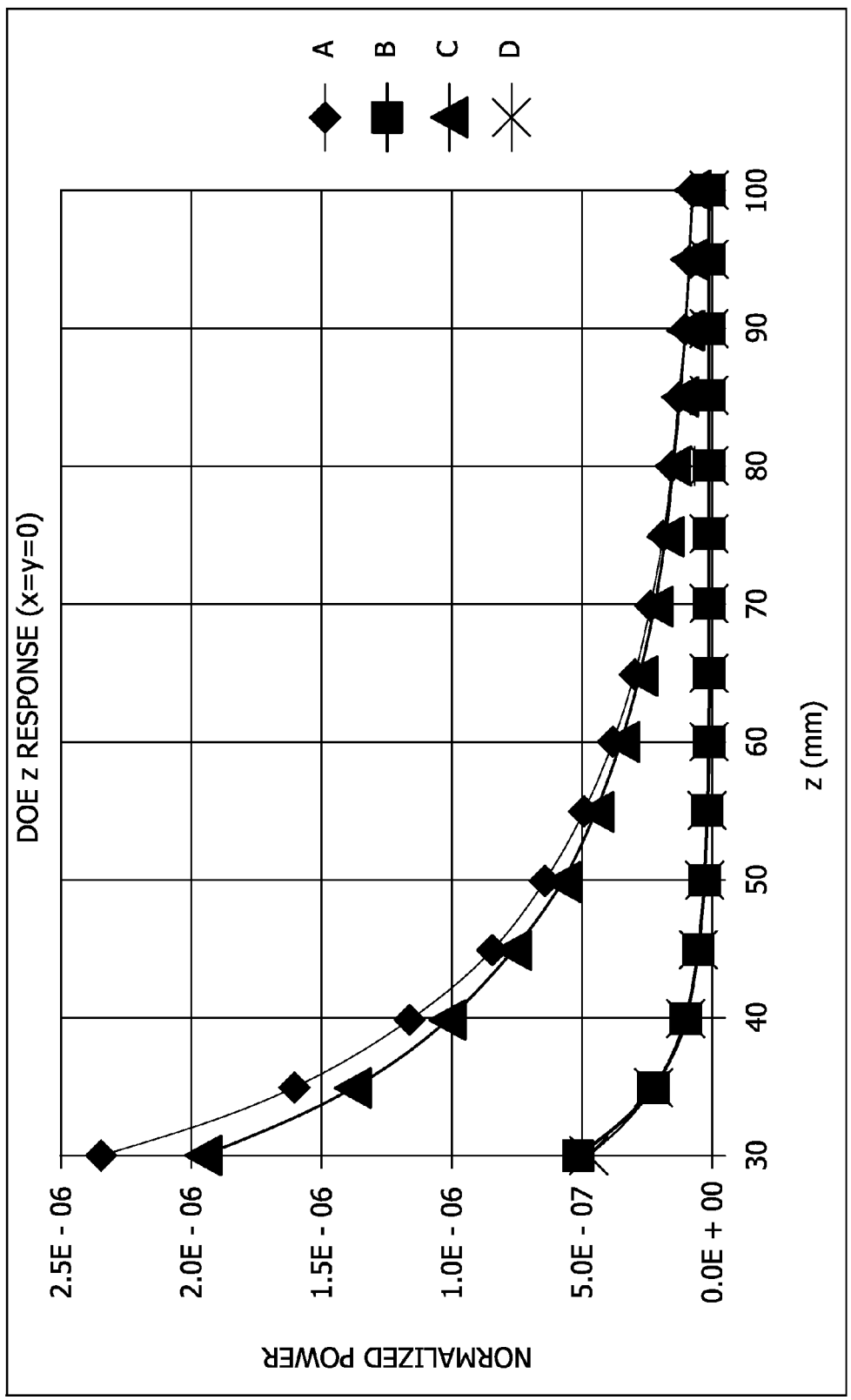

FIG. 8 provides a graphical depiction of simulation results for an xyz finger scan for a planar DOE lens when the planar DOE lens is implemented as shown in FIG. 2 and/or FIG. 3, the graphical depiction illustrating simulated diode signal response in a third direction (e.g., a z-direction; along a z-axis) in accordance with an exemplary embodiment of the present disclosure.

Figure 9:
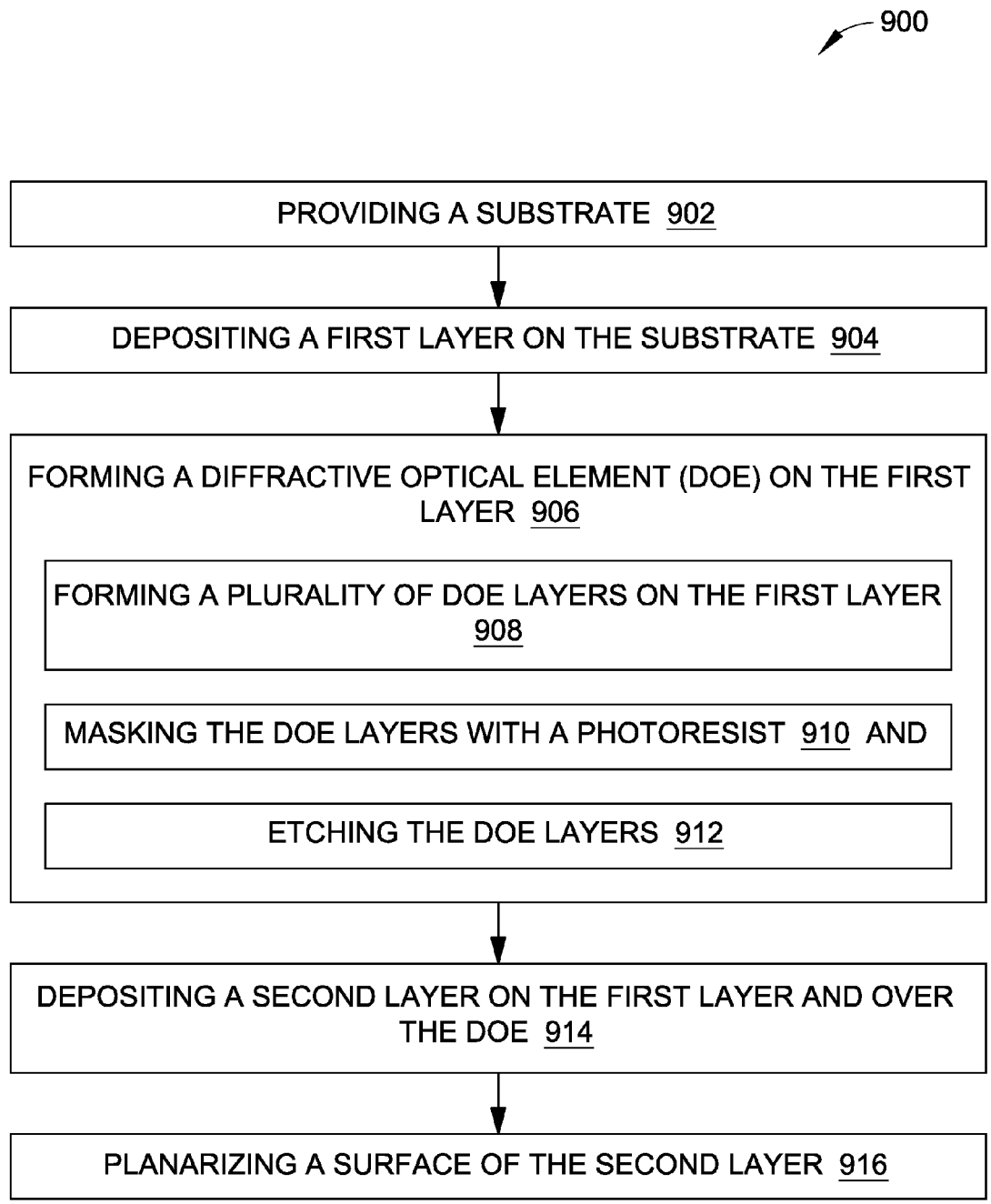

FIG. 9 depicts a flow diagram illustrating an example process for fabricating a planar DOE lens in accordance with an exemplary embodiment of the present disclosure.

DETAILED DESCRIPTION

Overview

Currently-implemented diffractive optical element (DOE) lenses have their DOE (e.g., diffractive surface, which includes microstructures (e.g., fine surface structures, micron and sub-micron step structures)), formed at a front surface of the die or corner glass. The DOEs of these currently-implemented DOE lenses, through exposure to their application environments and/or their fabrication environments, are highly sensitive to contamination and surface defects.

Described herein is a method for producing a planar DOE lens which is less sensitive to environmental factors than currently-implemented DOE lenses.

Example Implementations

Figure 1:
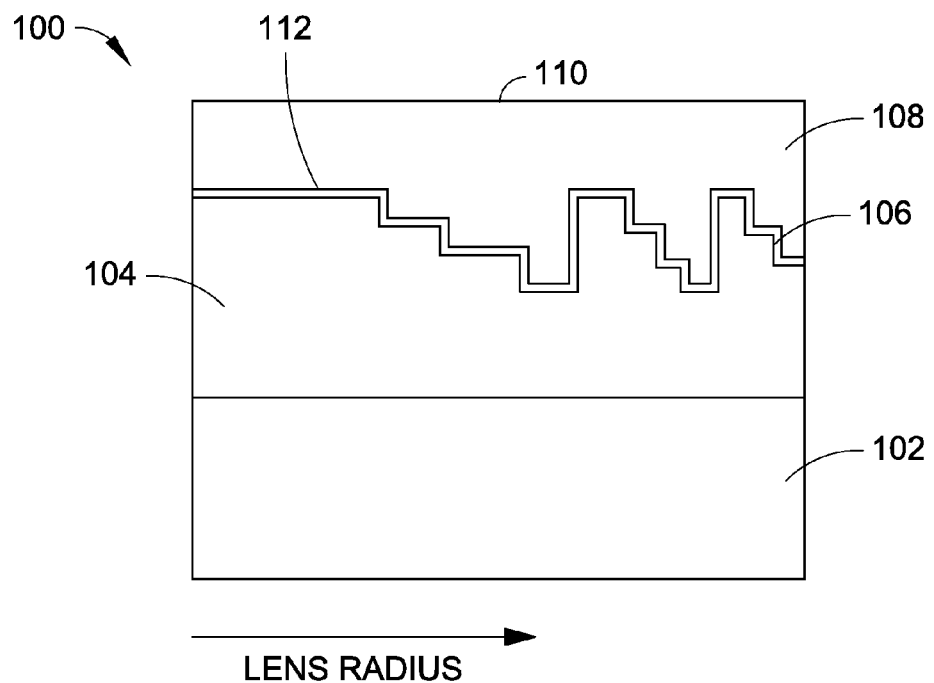
FIG. 1 is a conceptual layout of a planar diffractive optical element (DOE) lens in accordance with an exemplary embodiment of the present disclosure.

FIG. 1 (FIG. 1) is a conceptual layout of a planar diffractive optical element (DOE) lens in accordance with an exemplary embodiment of the present disclosure. In embodiments, the planar DOE lens 100 includes a substrate 102. In embodiments, the substrate 102 is a light transmissive (e.g., transparent) substrate. For example, the substrate 102 can be transmissive to wavelength(s) of interest selected from a range of wavelengths from and including infrared (IR) to and including ultraviolet (UV) wavelengths if a percentage of incident light (e.g., ten percent) specified by an application is transmitted through the substrate 102. In other embodiments, the substrate 102 is a light absorptive substrate. In embodiments, the substrate 102 is a wafer. For example, the wafer 102 is a thin slice of semiconductor material, such as silicon crystal or silicon dioxide. In other embodiments, the substrate 102 is formed of sodium borosilicate glass, sapphire, and/or fuse silica.

In embodiments, the planar DOE lens 100 includes a first layer 104, the first layer 104 being formed upon (e.g., deposited on) the substrate 102. In embodiments, the first layer 104 is formed of a dielectric material. In embodiments, the first layer 104 is formed of a light transparent material. In embodiments, the first layer 104 is formed of an anti-reflective material which reduces reflection as light travels through the planar DOE lens 100. In a specific example embodiment, the material forming the first layer 104 may be titanium dioxide. In a specific example embodiment, the thickness of the first layer 104 may be approximately twenty micrometers. However, the material and thickness of the first layer 104 are not limited to this/these materials/value(s).

In embodiments, a diffractive optical element (DOE) 106 (e.g., a diffractive surface with micro-structure(s), surface diffractive features, sub-micron structures, fine surface structures, micron step structures, sub-micron step structures, step features, DOE surfaces, and/or lens sub-micron structure(s)) is formed on and/or in the first layer 104. In embodiments, a standard DOE lithography process is used for forming (e.g., developing) the DOE 106 on and/or in the first layer 104. In embodiments, the DOE 106 includes a stack of phase shifting layers which are patterned to form the desired DOE. For example, the phase shifting layers can be formed of amorphous silicon or silicon nitride. In some embodiments, the DOE 106 may further include a plurality of layers (e.g., etch stop layers), which are located between adjacent phase shifting layers of the DOE 106, such that each phase shifting layer is separated from an adjacent phase shifting layer by an etch stop layer. In embodiments, the etch stop layers can be formed of silicon dioxide or other materials. In embodiments, the layers (e.g., phase shifting layers, etch stop layers) of the DOE 106 are formed by chemical vapor deposition, such as plasma enhanced chemical vapor deposition (PECVD). In embodiments, the thicknesses of the phase shifting layers and the etch stop layers of the DOE 106 depend upon the wavelength of interest, the number of layers, and/or the refractive indices of the materials. In embodiments, once the stack of layers of the DOE 106 is formed, a top phase shifting layer is masked by a photoresist and then etched, the etch stop layer located directly beneath the top phase shifting layer is used to stop the etching. Then, the etch stop layer is etched using the next phase shifting layer (e.g., the phase shifting layer directly beneath the etch stop layer) to stop the etching. The successive layers of the stack of the DOE 106 are masked and etched as described above to form the DOE 106. In other embodiments, the profile of the DOE 106 can be constructed by different lithography processes than what is described above followed by etching steps. The number of levels in the profile of the DOE 106 can be 2^N, N being equal to the number of litho-etch steps. In further embodiments, rather than etch stop processes, other etch processes, such as time etch processes may be implemented for constructing (e.g., forming) the profile of the DOE 106. In some embodiments, where the profile of the DOE 106 is a Blazed profile, or a digitized pattern with many levels, this may be fabricated by implementing the following steps: 1) coating of polymer; 2) nano-imprinting using a mask with a three-dimensional (3-D) profile of the DOE structures; and 3) etching. The 3-D nano-imprinting mask may be made/constructed by N lithography steps. This is advantageous in that N lithography steps do not need to be done on the process wafer, where the DOEs are going to be located, but only once, on the nano-imprinting mask In embodiments, the planar DOE lens 100 includes a second layer 108, the second layer 108 being formed upon (e.g., deposited on) the first layer 104 and over the DOE 106. In embodiments, the second layer 108 is formed of a material which is selected based upon its hardness properties. For example, the material forming the second layer 108 is silicon dioxide. In some embodiments, the second layer 108 may be formed of a dielectric material. In embodiments, the second layer 108 includes a first surface 110 (e.g., upper surface, distal surface) and a second surface 112 (e.g., lower surface), the second surface 112 being disposed opposite the first surface 110. For example, the first surface 110 is oriented away from the first layer 104, while the second surface 112 is disposed directly upon (e.g., against) the first layer 104. In embodiments, the first surface 110 (e.g., the exposed surface) of the second layer 108 is planarized (e.g., flattened), thereby allowing the exposed surface 110 to form a planar surface. For instance, a process implementing mechanical and/or chemical forces is used for planarizing the first surface 110 of the second layer 106. In embodiments, the planar surface 110 faces (e.g., is oriented towards) the air interface.

In embodiments, the second layer 108 is formed over the DOE 106, thereby providing a protective coating (e.g., a protective oxide layer) over the DOE 106. In embodiments, materials other than titanium dioxide and silicon dioxide can be implemented to form the first layer 104 and the second layer 108. Materials implemented for forming the first and second layers (104, 108) can be selected as necessary for creating the changing index of refraction required for proper focusing of the planar DOE lens 100. In embodiments, the planar DOE lens 100 is configured in a circular (e.g., spherical) shape. For example, when configured in a circular shape, the planar DOE lens has a diameter of twenty-four micrometers. In other embodiments, the lens is configured in various other shapes (e.g., square, rectangular, etc.). In embodiments, the planar DOE lens 100 has a thickness of approximately twenty micrometers.

Because the second layer 108 forms a protective layer over (e.g., covers) the DOE 106 of the planar DOE lens 100, this greatly reduces (e.g., eliminates) exposure of the DOE 106 to air, thereby promoting increased yield and reliability of the lens. This is achieved without inhibiting the focusing capability of the lens 100. Further, the second layer 108, by providing a protective layer over the DOE 106 of the lens 100 provides a lens 100 which is robust against defects. The planar DOE lens 100 described above provides a multi-layer (dual-layer) design which allows for the DOE 106 to be self-contained. Further, the planar, double-layer design of the planar DOE lens 100 greatly reduces (e.g., eliminates, prevents) exposure of the DOE 106 to an application environment of the lens (e.g., air) and/or a fabrication environment of the lens (e.g., test equipment, handler interface, etc.), thereby greatly reducing (e.g., eliminating) the possibility of surface defects and/or contamination. Still further, the above-described dual-layer structure of the planar DOE lens 100 promotes the ability of the lens to be integrated within a lens processing flow (e.g., a wafer-level package (WLP) process) at an earlier stage in such a manner that processing is able to be continued. In embodiments, the hardness of the second layer (e.g., silicon dioxide layer) 108 promotes ease of cleaning of the lens 100.

In embodiments, the planar DOE lens 100 is configured for being implemented in any one of a number of various optical systems which require and/or incorporate a lens. In embodiments, the planar DOE lens 100 can be incorporated into any DOE optical lens application where focusing light to improve performance is wanted. In embodiments, the planar DOE lens 100 can be implemented as part of a gesture sensing device (e.g., a sensor, a gesture sensor, an optical sensor, an optical gesture sensor). For example, the planar DOE lens 100 can be implemented in an optical lens structure of any of the gesture sensing devices described in the co-owned and co-pending U.S. Patent Application Pub. No. US 2012/0280904, filed Jan. 17, 2012, and entitled "Method For Detecting Gestures Using a Multi-Segment Photodiode and One or Fewer Illumination Sources", and the co-owned and co-pending U.S. Patent Application Pub. No. 2012/0280107, filed Nov. 25, 2011, and entitled "Optical Gesture Sensor Using a Single Illumination Source" which are herein incorporated by reference in their entireties. In such embodiments, the planar DOE lens 100, when implemented as part of an optical lens structure of the gesture sensing device (e.g., optical sensor), is located above the photo sensor (e.g., above the photodiodes). The second layer 108 of the DOE lens 100 is located at a first height above the photo sensor (e.g., photodiodes, diodes), while the first layer 104 is located at a second height above the photo sensor (e.g., diodes), the first height being greater than the second height. Further, the first (e.g., planar) surface 110 of the second layer 108 is oriented away from the photo sensor (e.g., diodes), while the second surface 112 of the second layer is oriented towards the photo sensor (e.g., diodes) of the gesture sensing device. FIG. 2 (FIG. 2) illustrates a top plan view of the planar DOE lens 100 being located above the photodiodes 150 when implemented in (e.g., as part of) an optical lens structure of a gesture sensing device (e.g., optical sensor). In the illustrated embodiment shown in FIG. 2, the lens 100 is configured in a circular shape and is implemented with a segmented photo sensor having four segments (e.g., diodes, pixels) 150.

In embodiments, the planar DOE lens 100 can be used with color detectors to increase the response and reduce the physical diode footprint of the color detectors. FIG. 3 (FIG. 3) illustrates this by depicting a top plan view of a further embodiment in which an array of square-shaped planar DOE lenses 100 is located above a corresponding array of photodiodes 250 when implemented in (e.g., as part of) an optical lens structure of a gesture sensing device (e.g., optical sensor). In the illustrated embodiment in FIG. 3, the array of planar DOE lenses 100 is implemented with the corresponding array of pixels (e.g., diodes) 250, such that the array of lenses 100 and pixels 250 are a 21×21 array occupying (e.g., populating) a typical gesture sensor area (e.g., 0.5 millimeters×0.5 millimeters).

In further embodiments, the planar DOE lens 100 is implemented as part of a gesture sensing device (e.g., sensor), which is further implemented within a gesture sensing system, which can be a larger electronic system or device. For instance, the gesture sensing system can be a hand-held device, a tablet computing device, a smartphone, an e-reader device, a cell phone, a notebook computing device, a laptop computing device, or a video game console. In embodiments, the gesture sensing system implementing a gesture sensing device (e.g., sensor) which includes the planar DOE lens 100 is a non-contact, human interface device which allows the user to control its operation without having to touch the gesture sensing system. In embodiments, the gesture sensing system implementing a gesture sensing device (e.g., sensor) which includes the planar DOE lens 100 is configured for understanding simple gestures (e.g., simple hand gestures) such as: left-to-right motions, right-to-left motions, up-to-down motions, down-to-up motions, in-to-out motions (e.g., motions away from the system), and out-to-in motions (e.g., motions towards the system). In embodiments, the gesture sensing system implementing a gesture sensing device (e.g., sensor) which includes the planar DOE lens 100 is configured for understanding complex gestures (e.g., complex hand gestures) such as: arbitrary two-dimensional linear motions (e.g., diagonals), rotational motions, finger tracking motions. In embodiments, the user of the gesture sensing system uses such gestures to control the operation of the gesture sensing system (e.g., device). For example, if the gesture sensing system is an e-reader device, a user may provide a left-to-right motion which, when sensed by the device, causes a page which is being viewed on a display of the device to be advanced. Further, a user may provide an out-to-in motion which, when sensed by the device, causes an image being viewed on a display of the device to be magnified.

When implemented within a gesture sensing device (e.g., an optical sensor), the planar DOE lens 100, due to its above-described construction, provides a number of advantages. For example, the above-described dual-layer construction of the planar DOE lens 100 promotes an increase in the amount of incoming light which is provided to the gesture sensing device (e.g., optical sensor), thereby allowing the gesture sensing device (e.g., optical sensor) to provide enhanced signal-to-noise ratio and sensitivity at greater distances with regard to proximity detection. In embodiments, the planar DOE lens 100 allows the gesture sensing device (e.g., optical sensor) to have enhanced sensitivity to infrared (IR) light-emitting diode (LED) emitters, thereby promoting the ability of the gesture sensing device to detect a gesture at greater distances. Thus, the planar DOE lens 100 is configured for improving the gesture sensing device (e.g., optical sensor) within which the lens 100 is implemented by increasing the range over which the gesture sensing device (e.g., optical sensor) works. Additionally, the planar DOE lens can increase the light on a pixel from a particular angle.

FIGS. 4 and 5 (FIGS. 4 and 5) provide graphical depictions of simulation results corresponding to the planar DOE lens 100, when implemented as shown in FIG. 2 and/or FIG. 3. As mentioned above, the planar DOE lens 100 can be implemented with a segmented photo sensor having four segments (e.g., diodes, pixels) 150, as shown in FIG. 2. In other embodiments, the segmented photo sensor may have more or less than four segments (e.g., diodes, pixels) 150. The simulation measured the response of the diodes 150 to light incident at an angle. The simulation was conducted over a range of angles from −70 degrees to 70 degrees. FIG. 4 provides a graphical depiction of the diode signal strength versus the angle of the light. FIG. 5 provides a graphical depiction of differential response versus the angle of the light. The graphical depictions in FIGS. 4 and 5 indicate that high differential response is achievable, thereby indicating the focusing advantages of the planar DOE lens 100. Further, the graphical depictions in FIGS. 4 and 5 indicate very good angle detection and high extinction ratio at twenty degrees.

FIGS. 6, 7 and 8 (FIGS. 6, 7 and 8) provide graphical depictions of simulation results corresponding to the planar DOE lens 100, when implemented as shown in FIG. 2 and/or FIG. 3. As mentioned above, the planar DOE lens 100 can be implemented with a segmented photo sensor having four segments (e.g., diodes, pixels) 150, as shown in FIG. 2. The simulation measured the optical results for a xyz finger scan. FIGS. 6, 7 and 8 show graphical depictions of a simulated diode signal response in three orientations (e.g., three directions). FIG. 6 provides a graphical depiction of a simulated diode signal response in an x-direction (e.g., along an x-axis). FIG. 7 provides a graphical depiction of a simulated diode signal response in a y-direction (e.g., along a y-axis). FIG. 8 provides a graphical depiction of a simulated diode signal response in a z-direction (e.g., along a z-axis). FIGS. 6, 7 and 8 indicate that the DOE lens 100 provides good gesture characteristics.

Example Fabrication Processes

FIG. 9 (FIG. 9) depicts a flowchart illustrating an example process (e.g., method) for fabricating the planar DOE lens 100 in accordance with an exemplary embodiment of the present disclosure. In embodiments, the method 900 includes the step of providing a substrate (Step 902). For example, the substrate is a light transmissive substrate, such as a wafer formed of silicon.

In embodiments, the method 900 further includes the step of depositing a first layer on the substrate (Step 904). For example, the first layer may be formed of a transparent, dielectric and/or anti-reflective material, such as titanium dioxide.

In embodiments, the method 900 further includes the step of forming a diffractive optical element (DOE) on the first layer (Step 906). It is contemplated that any one of a number of various processes may be implemented in forming the DOE profile, such as discussed above. In a specific exemplary embodiment, the step of forming a DOE on the first layer includes the sub-step of forming a plurality of DOE layers on the first layer (Step 908). For example, the DOE includes a stack of phase shifting layers and etch stop layers, the phase shifting layers being formed of amorphous silicon, silicon nitride, or the like, the etch stop layers being formed of silicon dioxide. In embodiments, the DOE layers (e.g., phase shifting layers and etch stop layers) can be formed on the first layer via chemical vapor deposition. In embodiments, the step of forming a DOE on the first layer further includes the sub-steps of masking the DOE layers with a photoresist and etching the DOE layers (Steps 910 and 912).

In embodiments, the method 900 further includes the step of depositing a second layer on the first layer and over the DOE (Step 914). In embodiments, the second layer is formed of silicon dioxide and is configured for protecting (e.g., enclosing) the DOE.

In embodiments, the method 900 further includes the step of planarizing a surface of the second layer (Step 916). In embodiments, the planarized surface is an air interface surface of the second layer (e.g., a top surface of the second layer, surface which is distal to the DOE.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An optical sensor, comprising:
   an array of photodiodes;
   a substrate disposed over the array of photodiodes;
   a first layer, the first layer being formed upon the substrate;
   a diffractive optical element, the diffractive optical element being formed upon the first layer; and
   a second layer formed of a dielectric material, the second layer being formed directly upon the first layer, the second layer being formed over the diffractive optical element, the second layer including a planar surface,
   wherein the second layer encloses the diffractive optical element between the first layer and the second layer, and wherein the first layer and the second layer include material with indexes of refraction selected to achieve an appropriate focus.

2. The optical sensor as claimed in claim 1, wherein the substrate is light transmissive or light absorptive.

3. The optical sensor as claimed in claim 1, wherein the substrate is a silicon wafer.

4. The optical sensor as claimed in claim 1, wherein the substrate is formed of: quartz, sodium borosilicate glass, sapphire, or fuse silica.

5. The optical sensor as claimed in claim 1, wherein the first layer is formed of a light transparent material.

6. The optical sensor as claimed in claim 1, wherein the first layer is formed of an anti-reflective material.

7. The optical sensor as claimed in claim 1, wherein the first layer is formed of a dielectric material.

8. The optical sensor as claimed in claim 1, wherein the first layer is formed of titanium dioxide.

9. The optical sensor as claimed in claim 1, wherein the second layer is formed of silicon dioxide.

10. The optical sensor as claimed in claim 1, wherein the planar surface is an air interface surface.

11. An optical sensor, comprising:
    an array of photodiodes;
    a light transmissive substrate disposed over the array of photodiodes;
    a first layer, the first layer being formed upon the substrate, the first layer being formed of a light transparent material;
    a diffractive optical element, the diffractive optical element being formed upon the first layer; and
    a second layer formed of a dielectric material, the second layer being formed directly upon the first layer, the second layer being formed over the diffractive optical element, the second layer including a planar surface, the planar surface being an air interface surface,
    wherein the second layer encloses the diffractive optical element between the first layer and the second layer, and wherein the first layer and the second layer include materials with indexes of refraction selected to achieve an appropriate focus.

12. The optical sensor as claimed in claim 11, wherein the substrate is a silicon wafer.

13. The optical sensor as claimed in claim 11, wherein the first layer is formed of an anti-reflective material.

14. The optical sensor as claimed in claim 11, wherein the first layer is formed of a dielectric material.

15. The optical sensor as claimed in claim 11, wherein the first layer is formed of titanium dioxide.

16. A method for fabricating an optical sensor, the method comprising:
    providing a substrate;
    depositing a first layer on the substrate;
    forming a diffractive optical element on the first layer;
    depositing a second layer formed of a dielectric material on the first layer and over the diffractive optical element, the second layer being placed directly upon the first layer to enclose the diffractive optical element between the first layer and the second layer, the first layer and the second layer including materials with indexes of refraction selected to achieve an appropriate focus;

planarizing a surface of the second layer; and
disposing the substrate over an array of photodiodes.

17. The method as claimed in claim 16, wherein forming the diffractive optical element on the first layer comprises:
    forming a plurality of diffractive optical element layers on the first layer.

18. The method as claimed in claim 17, wherein forming the diffractive optical element on the first layer further comprises:
    masking the plurality of diffractive optical element layers with a photoresist.

19. The method as claimed in claim 18, wherein forming the diffractive optical element on the first layer further comprises:
    etching the plurality of diffractive optical element layers.

* * * * *